United States Patent
Glickman et al.

(10) Patent No.: US 6,454,338 B1
(45) Date of Patent: Sep. 24, 2002

(54) INTEGRATED VEHICLE TAILGATE

(75) Inventors: David Brian Glickman, Southfield, MI (US); David Benjamin Tuck, Saline, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/627,856

(22) Filed: Jul. 28, 2000

(51) Int. Cl.⁷ .......................... B62D 33/03; B62D 33/08; B60P 3/00; B62C 1/06
(52) U.S. Cl. .................. 296/57.1; 296/26.1; 296/26.11; 296/61; 296/62
(58) Field of Search .......................... 296/26.08, 26.09, 296/26.1, 26.11, 57.1, 61, 62

(56) References Cited

U.S. PATENT DOCUMENTS

| | | | | |
|---|---|---|---|---|
| 2,603,529 A | * | 7/1952 | Troth et al. ................. 296/61 |
| 3,010,760 A | * | 11/1961 | Trautmann ................ 296/57.1 |
| 3,642,156 A | * | 2/1972 | Stenson ..................... 296/61 |
| 4,021,071 A | * | 5/1977 | Norman ..................... 296/62 |
| 4,624,619 A | | 11/1986 | Uher |
| 4,864,673 A | * | 9/1989 | Adaway et al. ............. 396/61 |
| 5,244,335 A | * | 9/1993 | Johns ....................... 296/61 |
| 5,273,335 A | | 12/1993 | Belnap et al. |
| 5,312,149 A | * | 5/1994 | Boone ....................... 296/61 |
| 5,468,038 A | * | 11/1995 | Sauri ....................... 296/57.1 |
| 5,468,114 A | * | 11/1995 | Hickerson ................. 296/61 |
| 5,478,130 A | * | 12/1995 | Matulin et al. ............ 296/57.1 |
| 5,538,308 A | * | 7/1996 | Floe ........................ 296/61 |
| 5,741,039 A | * | 4/1998 | Habdas ..................... 296/57.1 |
| 5,752,800 A | * | 5/1998 | Brincks et al. ............ 296/57.1 |
| 5,765,892 A | * | 6/1998 | Covington ................. 296/57.1 |
| 5,775,759 A | * | 7/1998 | Cummins ................... 296/57.1 |
| 5,788,311 A | * | 8/1998 | Tibbals .................... 296/26.11 |
| 5,803,523 A | * | 9/1998 | Clark et al. .............. 296/26.1 |
| 5,816,638 A | * | 10/1998 | Pool, III .................. 296/57.1 |
| 5,826,932 A | * | 10/1998 | DeSimone ................. 296/57.1 |
| 5,902,000 A | * | 5/1999 | Wold ....................... 296/26.11 |
| 5,907,276 A | | 5/1999 | Lance |
| 5,918,925 A | | 7/1999 | Perrin |
| 5,975,608 A | * | 11/1999 | Jarman .................... 296/26.11 |
| 5,988,725 A | * | 11/1999 | Cole ........................ 296/61 |
| 6,045,172 A | * | 4/2000 | Thomas et al. .......... 296/26.1 |
| 6,364,392 B1 | * | 4/2002 | Meinke ..................... 296/62 |

FOREIGN PATENT DOCUMENTS

| | | | |
|---|---|---|---|
| DE | 2745751 A1 | 4/1979 | |
| DE | 2745751 | * 4/1979 | ................. 296/57.1 |

\* cited by examiner

*Primary Examiner*—D. Glenn Dayoan
*Assistant Examiner*—H. Gutman
(74) *Attorney, Agent, or Firm*—David Kelley

(57) ABSTRACT

The present invention provides an integrated tailgate for a vehicle having a planar cargo bed, the tailgate operable between a closed vertical position and an open horizontal position, and a structure slideably received by the tailgate extendable to a substantially horizontal position when the tailgate is in the open position, whereat the structure is rotateably operable between the horizontal position, an upwardly rotated substantially vertical position perpendicular to the open tailgate, and a downwardly rotated position a predetermined degree between zero and ninety degrees.

13 Claims, 2 Drawing Sheets

INTEGRATED VEHICLE TAILGATE

FIELD OF THE INVENTION

The present invention relates to automotive vehicle tailgates, and more specifically, to a tailgate having an integrated retractable load starter, step assist, and bed extender.

BACKGROUND OF THE INVENTION

In the use of automotive vehicles, and particularly pickup trucks, it is often desired to move heavy and awkward loads into the cargo bed of the vehicle. Although these vehicles are designed to transport such loads, loading and unloading such cargo can be quite difficult. It is beneficial when loading cargo to have an extended surface upon which to start the load into the bed, especially when the open tailgate is not sufficient in length. In turn, having an operator in the cargo bed of the vehicle is beneficial for facilitating loading and unloading cargo, however, getting the operator into the cargo bed can be problematic due to the height of the bed. These vehicles are also limited in cargo carrying capacity, where it is often the case that the operator desires to carry objects that extend beyond the length of the bed. Load starters, step assists, and bed extenders have been employed in the past to ease loading, operator entry into the cargo bed, and to extend the usable length of the bed, however, they have been separate and external cumbersome devices that also aesthetically change the appearance of the vehicle.

It is therefore desired to have a retractable load starter, internal with respect to the tailgate, that could be used to facilitate getting the load into the bed. It is also desired to have a retractable step assist, internal with respect to the tailgate, that could be used when needed for operator's ease of entry into and from the cargo bed. Furthermore, it is desired to have a retractable bed extender, internal with respect to the tailgate, that could be used for supporting and containing loads that extend beyond the normal cargo bed area. It is also desired that the load starter, step assist, and bed extender be simple to use, and not change the appearance of the vehicle. As such, it is desired to have a tailgate that not only integrates a load starter, step assist, and bed extender, but is also retractable and internal with respect to the tailgate.

SUMMARY OF THE INVENTION

It is an object of the present invention to provide a vehicle having a tailgate with a load starter, step assist, and bed extender that overcomes the disadvantages of the prior art.

It is a feature of the present invention that the tailgate has a structure which is internal with respect thereto and accomplishes the functions of a load starter, step assist, and bed extender.

Accordingly, the present invention advantageously provides an integrated tailgate for a vehicle having a planar cargo bed, the tailgate operable between a closed vertical position and an open horizontal position, and a structure slideably received by the tailgate extendable to a substantially horizontal position when the tailgate is in the open position, whereat the structure is rotateably operable between the horizontal position, an upwardly rotated substantially vertical position perpendicular to the open tailgate, and a downwardly rotated position a predetermined degree between zero and ninety degrees, thereby integrating the multiple purposes of a load starter, bed extender, and step assist, respectively.

BRIEF DESCRIPTION OF THE DRAWINGS

These and other objects, features, and advantages of the present invention will become apparent from a reading of the following detailed description with reference to the accompanying drawings, in which:

As shown in FIG. 3, the combination load starter, step assist, and bed extender structure 8 is rotated downward preferably 45 degrees from the horizontal in order to utilize the step rail 14. In this position the structure 8 advantageously functions as a step in order to assist an operator in entering into and exiting from the cargo bed 4. Other downward angles for the step assist position may be used without departing from the scope of the present invention, however, 45 degrees advantageously places the step a predetermined distance from the tailgate 6 thereby p undesired operator contact therewith.

DESCRIPTION OF THE PREFERRED EMBODIMENTS

Figure 1:
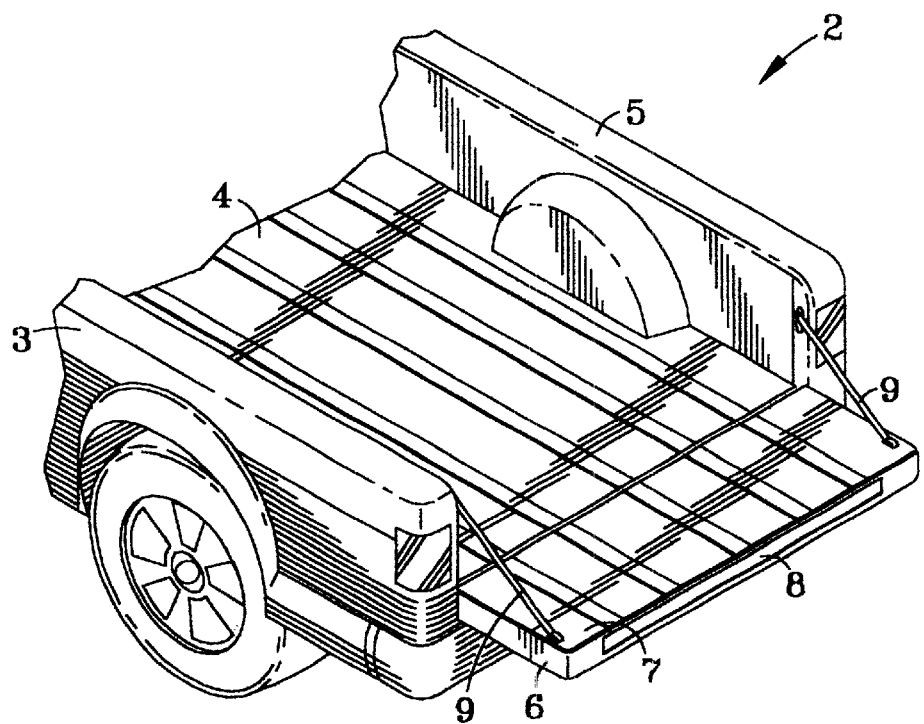
FIG. 1 is a partial perspective view of a pickup truck with an integrated vehicle tailgate in the open position according to the present invention.

Referring to FIG. 1, a pickup truck 2 has a cargo bed 4 whose rear end is closable via a pivotally mounted integrated tailgate 6. The cargo bed 4 is enclosed on opposite sides by a left and right rear quarter panel 3 and 5 respectively. The cargo bed 4 is a substantially planar, horizontal surface. The tailgate 6 has a substantially planar inner surface 7. The tailgate 6 is shown in an open position, where the cargo bed 4 is substantially flush and coplanar with the tailgate inner surface 7. The tailgate 6 is held in the open position by a pair of supports 9.

Figure 2:
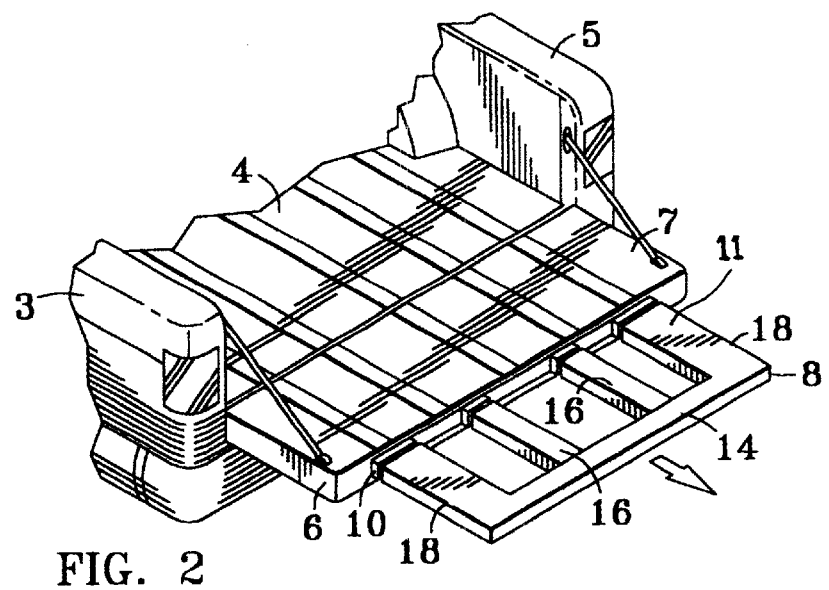
FIG. 2 is a partial perspective view of the combination load starter, step assist, and bed extender structure in an extended horizontal load starter position according to the present invention.

As shown in FIG. 2, a retractable combination load starter, step assist, and bed extender structure 8 is shown in a fully extended horizontal position external of the tailgate 6. In this position, an upper surface 11 of the structure 8 is substantially flush and coplanar with the tailgate inner surface 7 and the cargo bed 4. An innermost edge 10 of the structure 8 is pivotally connected to the tailgate 6. The structure 8 is slideable with respect to the tailgate 6 between extended and retracted positions. The structure 8 has a step rail 14, a pair of center rails 16, and a pair of end rails 18. The center and end rails, 16 and 18 respectively, are evenly spaced apart and are perpendicular with respect to the step rail 14. The structure 8 is preferably fabricated from sheet metal. In this position, the structure 8 acts as a load starter, or more specifically, an area adapted to receive cargo prior to being slid into the vehicle cargo bed 4. The structure 8, being in this extended horizontal position, doubles the size of the load starter, which is advantageous when loading large or awkward cargo.

Figure 3:
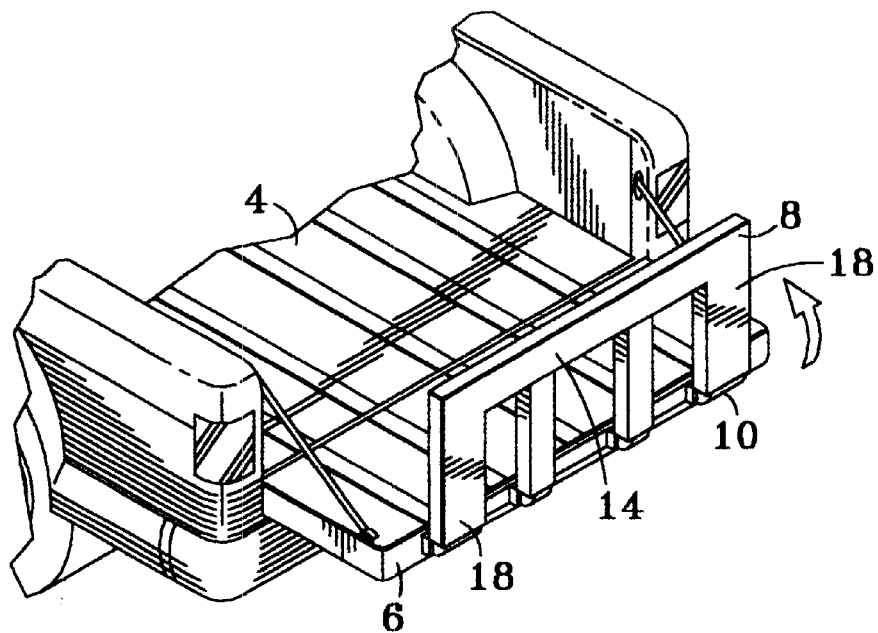
FIG. 3 is a partial perspective view of the combination load starter, step assist, and bed extender structure in a vertical bed extender position according to the present invention.

As shown in FIG. 3, the combination load starter, step assist, and bed extender structure 8 is rotated upward 90 degrees from the horizontal, thus being perpendicular to the open tailgate 6. In this position the structure 8 functions to enclose or contain the cargo bed 4 that has been extended by opening the tailgate 6. This position extends the usable space of the cargo bed 4, which is advantageous when transporting large or awkwardly shaped cargo.

Figure 4:
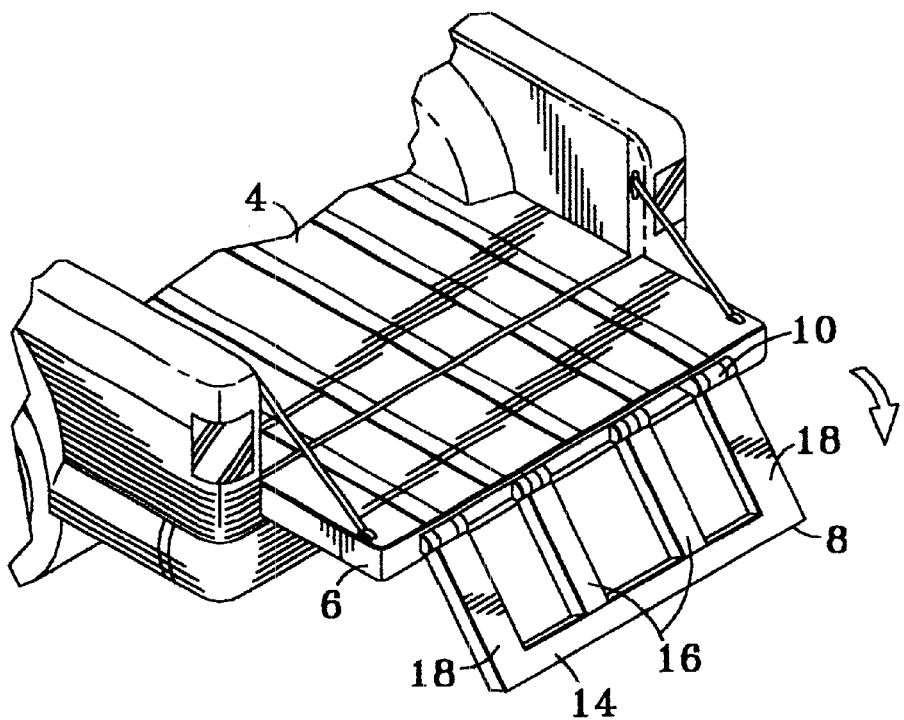
FIG. 4 is a partial perspective view of the combination load starter, step assist, and bed extender structure in a vertical bed extender position according to the present invention.

As shown in FIG. 4, the combination load starter, step assist, and bed extender structure 8 is rotated downward preferably 45 degrees from the horizontal in order to utilize the step rail 14. In this position the structure 8 advantageously functions as a step in order to assist an operator in entering into and from the cargo bed 4. Other downward angles for the step assist position may be used without departing from the scope of the present invention, however, 45 degrees advantageously places the step a predetermined distance from the tailgate 6 thereby preventing undesired operator contact therewith.

While only one embodiment of the combination load starter, step assist, and bed extender structure of the present invention has been described, others may be possible without departing from the scope of the following claims.

What is claimed is:

1. An integrated tailgate for a vehicle having a planar cargo bed comprising:

a tailgate, having a substantially planar inner surface, operable between a closed vertical position and an open horizontal position;

a unitary structure slideably received entirely within the tailgate, extendable to a substantially horizontal position when the tailgate is in the open position;

wherein the unitary structure is pivotally operable between the horizontal position, an upwardly rotated substantially vertical position perpendicular to the open tailgate, and a downwardly rotated position a predetermined degree between zero and ninety degrees; and wherein the unitary structure has at least one open space between longitudinal rails and a horizontal bar perpendicular to the rails adapted to be a step.

2. The integrated tailgate as defined in claim 1, wherein the tailgate inner surface is substantially flush and coplanar with the cargo bed when in the open horizontal position.

3. The integrated tailgate as defined in claim 1, wherein the unitary structure has an upper surface that is substantially flush and coplanar with the tailgate inner surface when in the open horizontal position.

4. The integrated tailgate as defined in claim 1, wherein the predetermined degree between zero and ninety degrees is forty-five degrees.

5. The integrated tailgate as defined in claim 1, wherein the structure is substantially the same width and length of the open tailgate.

6. An integrated tailgate for a vehicle having a planar cargo bed comprising:

a tailgate, having a substantially planar inner surface, operable between a closed vertical position and an open horizontal position;

a unitary structure slideably received entirely within the tailgate, extendable to a substantially horizontal position when the tailgate is in the open position, the unitary structure having at least one open space between longitudinal rails and a horizontal bar perpendicular to the rails adapted to be a step;

whereon the structure is pivotally operable between the horizontal position, an upwardly rotated substantially vertical position perpendicular to the open tailgate, and a downwardly rotated position a predetermined degree between zero and ninety degrees; and wherein the unitary structure has an upper surface that is substantially flush and coplanar with the tailgate inner surface when in the open horizontal position.

7. The integrated tailgate as defined in claim 6, wherein the tailgate inner surface is substantially flush and coplanar with the cargo bed when in the open horizontal position.

8. The integrated tailgate as defined in claim 6, wherein the predetermined degree between zero and ninety degrees is forty-five degrees.

9. The integrated tailgate as defined in claim 6, wherein the structure is substantially the same width and length of the open tailgate.

10. An integrated tailgate for a vehicle having a planar cargo bed comprising:

a tailgate, having a substantially planar inner surface, operable between a closed vertical position and an open horizontal position;

a unitary structure slideably received entirely within the tailgate, extendable to a substantially horizontal position when the tailgate is in the open position, the unitary structure having a plurality of longitudinal rails with a plurality of open spaces therebetween and a horizontal bar perpendicular to the rails adapted to be a step;

wherein the structure is pivotally operable between the horizontal position, an upwardly rotated substantially vertical position perpendicular to the open tailgate, and a downwardly rotated position a predetermined degree between zero and ninety degrees.

11. The integrated tailgate as defined in claim 10, wherein the tailgate inner surface is substantially flush and coplanar with the cargo bed when in the open horizontal position.

12. The integrated tailgate as defined in claim 10, wherein the predetermined degree between zero and ninety degrees is forty-five degrees.

13. The integrated tailgate as defined in claim 10, wherein the structure is substantially the same width and length of the open tailgate.

\* \* \* \* \*